US012338676B2

(12) United States Patent
Anderson et al.

(10) Patent No.: US 12,338,676 B2
(45) Date of Patent: Jun. 24, 2025

(54) FENESTRATION UNIT WITH PLURAL PANELS AND INTERPANEL COUPLING SYSTEM

(71) Applicant: JELD-WEN, Inc., Charlotte, NC (US)

(72) Inventors: Jacob D Anderson, Redmond, OR (US); Layne R Stubbs, Klamath Falls, OR (US); Jack M Mathes, Klamath Falls, OR (US)

(73) Assignee: JELD-WEN, Inc.

(*) Notice: Subject to any disclaimer, the term of this patent is extended or adjusted under 35 U.S.C. 154(b) by 0 days.

(21) Appl. No.: 18/491,427

(22) Filed: Oct. 20, 2023

(65) Prior Publication Data

US 2025/0129657 A1 Apr. 24, 2025

(51) Int. Cl.
*E06B 3/46* (2006.01)

(52) U.S. Cl.
CPC .................................... *E06B 3/469* (2013.01)

(58) Field of Classification Search
CPC ....................................................... E06B 3/469
USPC ............................................................ 49/458
See application file for complete search history.

(56) References Cited

U.S. PATENT DOCUMENTS 2,200,547 A * 5/1940 Grady ..................... E06B 7/232 49/458
2,212,221 A * 8/1940 Alexander ................ E06B 3/44 49/458
2,608,277 A * 8/1952 Storms ...................... E06B 3/44 49/458
3,153,818 A * 10/1964 Osten, Jr. .............. E06B 3/5063 49/458
4,351,131 A * 9/1982 Kubik ....................... E06B 3/42 49/504
4,726,147 A * 2/1988 Beske .................. E06B 7/2312 49/458

(Continued)

FOREIGN PATENT DOCUMENTS

CN 106555537 A * 4/2017
DE 3725000 A1 * 1/1981

(Continued)

OTHER PUBLICATIONS

Andersen, Panel Interlock Weatherstrip Replacement, Catalog Instructions.

(Continued)

*Primary Examiner* — Catherine A Kelly
(74) *Attorney, Agent, or Firm* — Lorenz & Kopf LLP

(57) ABSTRACT

A fenestration unit with a first panel and a second panel, one panel being supported for sliding relative to the other. The fenestration unit includes an interpanel coupling system with a first coupling member and a second coupling member. The first coupling member includes a first facing member and a first projection that projects from the first facing member into an interpanel gap. The second coupling member includes a second facing member and a second projection that projects from the second facing member into the interpanel gap. The coupling system including a seal member that is attached to the first projection or the second projection. The seal member is configured to engage and resiliently deflect against the other of the first projection and the second projection when the second panel is in the closed position.

20 Claims, 8 Drawing Sheets

(56) References Cited

U.S. PATENT DOCUMENTS

| | | | | |
|---|---|---|---|---|
| 9,540,862 | B2 * | 1/2017 | Takada | E06B 3/4681 |
| 10,837,221 | B2 * | 11/2020 | Cohen | E06B 3/46 |
| 10,947,772 | B2 * | 3/2021 | Weavers | E06B 3/305 |
| 11,326,393 | B2 * | 5/2022 | Gosling | E05B 65/0811 |
| 11,608,672 | B2 * | 3/2023 | Cohen | E06B 3/26347 |
| 11,873,677 | B2 * | 1/2024 | Siller | E06B 3/4415 |
| 11,959,330 | B2 * | 4/2024 | Lee | E06B 3/26 |
| 2021/0355744 | A1 * | 11/2021 | Alkhoury | E06B 3/2675 |
| 2024/0175311 | A1 * | 5/2024 | Chen | E06B 3/365 |

FOREIGN PATENT DOCUMENTS

| | | | | |
|---|---|---|---|---|
| DE | 4417583 A1 | * | 11/1995 | B66B 13/26 |
| DE | 202016000526 U1 | * | 4/2016 | E06B 3/02 |
| DE | 202019102317 U1 | * | 9/2020 | |
| DE | 102021125885 A1 | * | 4/2023 | E04B 7/166 |
| EP | 0003468 A2 | * | 8/1979 | |
| EP | 2400099 A1 | * | 12/2011 | |
| EP | 2960421 A1 | * | 12/2015 | |
| EP | 4249722 A1 | * | 9/2023 | E05D 15/06 |
| IT | 202200005855 A1 | * | 9/2023 | |
| KR | 101707777 B1 | * | 2/2017 | |
| KR | 20210020986 A | * | 2/2021 | |
| KR | 102263068 B1 | * | 6/2021 | |
| RU | 2708704 C2 | * | 12/2019 | E06B 3/26305 |
| WO | WO-2020235764 A1 | * | 11/2020 | E05C 7/00 |
| WO | WO-2023182995 A1 | * | 9/2023 | |

OTHER PUBLICATIONS

Jeld-Wen, Siteline Sliding Patio Door, Design Manual, Sep. 2023.
Pella, Reserve Traditional Sliding Patio Door, Design Manual, 2023.
Andersen, A-Series Gliding Patio Doors, Coastal Product Code, 2020.

* cited by examiner

FENESTRATION UNIT WITH PLURAL PANELS AND INTERPANEL COUPLING SYSTEM

TECHNICAL FIELD

The field of this disclosure relates generally to fenestration units and, more particularly, to a fenestration unit with plural panels and an interpanel coupling system.

BACKGROUND

Fenestration units, such as sliding patio door units, sliding window units, etc. may include a plurality of panels, at least one of which is slidingly supported in the frame. One panel may slide and move relative to another panel. Also a gap may be defined between the panels. It is desirable to block, close-off, and/or seal the gap between the panels (i.e., the "interpanel gap") to block weather, wind, precipitation, noise, etc.

However, providing solutions that block, close-off, and/or seal the interpanel gap presents several problems. These can be costly and/or difficult to include. Also, these interpanel gap features may need to be manufactured and assembled to high-tolerances to effectively block, close-off, and/or seal the gap, which increases costs, manufacturing and assembly time, etc.

Accordingly, there is a need for an improved interpanel feature that can block, close-off, and/or seal the interpanel gap between panels of a fenestration unit when one panel is in a closed position and that allows movement of the one panel toward an open position. There is a need for such an interpanel feature having a streamlined and simple design that reduces manufacturing costs and assembly time and that simplifies installation. Additionally, there is a need for an interpanel feature that effectively and efficiently operates to block, close-off, and/or seal the interpanel gap. There is a need for a feature that is highly adaptable to a number of configurations of fenestration units. There is a need for such a coupling system that also provides beneficial thermal performance, that provides structural support to the panels, and/or that provides other advantages. Additional aspects and benefits will be apparent from the following detailed description of example embodiments, which proceeds with reference to the accompanying drawings.

SUMMARY

A fenestration unit is disclosed that includes a frame that defines an axis. The fenestration unit includes a first panel supported in the frame and a second panel moveably supported in the frame for sliding movement along the axis between a closed position and an open position relative to the first panel. The second panel includes a second face configured to face a first face of the first panel to define an interpanel gap therebetween. The fenestration unit further includes an interpanel coupling system with a first coupling member and a second coupling member. The first coupling member includes a first facing member that is attached to the first panel to cover over at least part of the first face. The first coupling member also includes a first projection that projects from the first facing member into the interpanel gap. Moreover, the second coupling member includes a second facing member that is attached to the second panel to cover over at least part of the second face. The second coupling member includes a second projection that projects from the second facing member into the interpanel gap. The coupling system includes a seal member that is attached to one of the first projection and the second projection. The seal member is configured to engage and resiliently deflect against the other of the first projection and the second projection when the second panel is in the closed position. The seal member is configured to disengage the other of the first projection and the second projection and resiliently recover toward a neutral position as the second panel moves toward the open position.

Additionally, a method of manufacturing a fenestration unit is disclosed. The method includes providing a frame that defines an axis and supporting a first panel within the frame. The method also includes moveably supporting a second panel within the frame for sliding movement along the axis between a closed position and an open position relative to the first panel. The second panel includes a second face configured to face a first face of the first panel to define an interpanel gap therebetween. Furthermore, the method includes providing an interpanel coupling system with a first coupling member and a second coupling member. Moreover, the method includes attaching a first facing member of the first coupling member to the first panel to cover over at least part of the first face. The first coupling member includes a first projection that projects from the first facing member into the interpanel gap. Additionally, the method includes attaching a second facing member of the second coupling member to the second panel to cover over at least part of the second face. The second coupling member includes a second projection that projects from the second facing member into the interpanel gap. Moreover, the method includes attaching a seal member to one of the first projection and the second projection. The seal member is configured to engage and resiliently deflect against the other of the first projection and the second projection when the second panel is in the closed position. The seal member is configured to disengage the other of the first projection and the second projection and resiliently recover toward a neutral position as the second panel moves toward the open position.

Furthermore, a fenestration unit is disclosed that includes a frame that defines an axis. The fenestration unit includes a first panel supported in the frame, and the first panel includes a first stile. The fenestration unit also includes a second panel with a second stile moveably supported in the frame for sliding movement along the axis between a closed position and an open position relative to the first panel. The second stile includes a second face configured to face a first face of the first stile to define an interpanel gap therebetween. Moreover, the fenestration unit includes an interpanel coupling system with a first coupling member and a second coupling member. The first coupling member includes a first facing member that is attached to the first panel to cover over at least part of the first face, the first coupling member including a first projection that projects from the first facing member into the interpanel gap. The first projection provides bending stiffness to the first stile. The second coupling member includes a second facing member that is attached to the second panel to cover over at least part of the second face. The second coupling member includes a second projection that projects from the second facing member into the interpanel gap. The second projection provides bending stiffness to the second stile. The coupling system includes a first seal member that is attached to one of the first projection and the second projection. The first seal member is configured to engage and resiliently deflect against the other of the first projection and the second projection when the second panel is in the closed position. The first seal member is configured to disengage the other of the first projection and the second projection and resiliently recover toward a neutral position as the second panel moves toward the open position. The second coupling system includes a second seal member that is attached to one of the first panel and the second panel and that is configured to resiliently deflect within the interpanel gap as the second panel moves toward the closed position. The first coupling member is constructed from a first material and the second coupling member is constructed from a second material that is different from the first material. The first coupling member has higher fracture strength than the second coupling member, and the second coupling member has lower thermal conductivity than the first coupling member.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
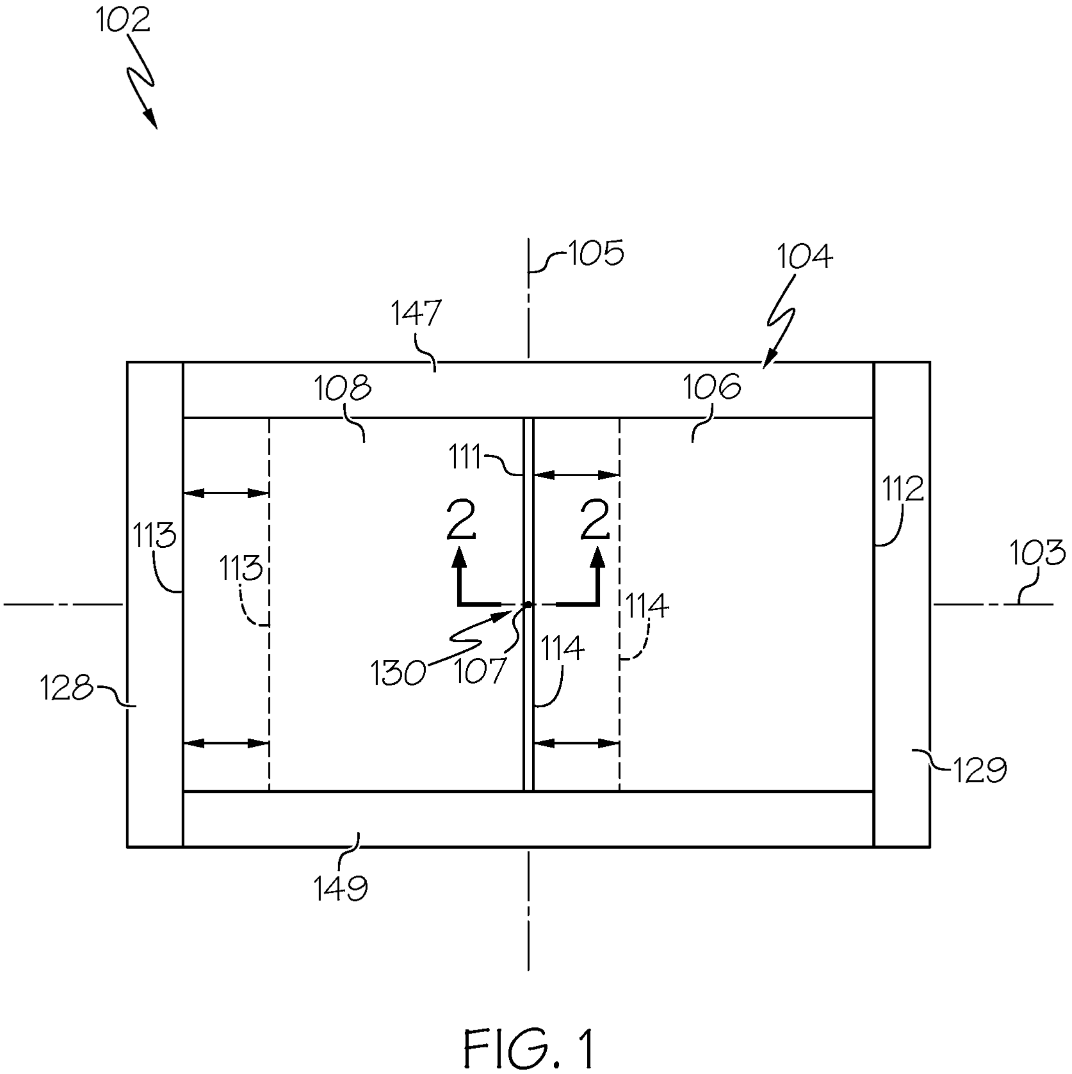
FIG. 1 is a front view of a fenestration unit for a dwelling configured according to example embodiments of the present disclosure, wherein the fenestration unit includes an interpanel coupling system of the present disclosure.

With reference to the drawings, this section describes embodiments of a fenestration unit and an interpanel coupling system therefor. Methods of manufacturing and assembly are also discussed. Throughout the specification, reference to "one embodiment," "an embodiment," or "some embodiments" means that a particular described feature, structure, or characteristic may be included in at least one embodiment of the sill arrangement. Thus, appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

Generally, embodiments of the present disclosure include a fenestration unit and an interpanel coupling system therefor. The interpanel coupling system may be configured for blocking, closing-off, and/or sealing the gap between panels in the fenestration frame. The coupling system may include a first coupling member that is attached to one panel and a second coupling member that is attached to another panel of the fenestration unit. The first coupling member and/or the second coupling member may have a shape, profile, dimension, or feature that provides reinforcement to its respective panel. For example, at least one coupling member may include a facing member that layers over and attaches to the panel and a projection (e.g., a rib, flange, etc.) that projects from the facing member and into the interpanel gap. The geometry of the coupling members may provide stiffness to the respective panel in the interior and exterior direction. Thus, the coupling members may reinforce the panels against excessive deflection, bowing, bending, etc.

Also, the materials and/or other characteristics of the coupling members may be suited and selected for their respective panel. For example, one coupling member may be constructed of and/or include a strong metallic material for providing reinforcement. The other coupling member may be constructed of and/or include a material with low thermal conductivity for improved thermal performance.

One panel may be supported for movement relative to another within a fenestration frame. For example, one panel may slide between an open position and a closed position. The interpanel coupling system may also include at least one sealing member that closes-off, blocks, and/or seals the interpanel gap when the panels are closed. At least one sealing member may be attached to one of the coupling members and may be configured to seal against the other coupling member when the panels are closed. The sealing member may resiliently compress between the coupling members when the fenestration unit is closed. The sealing member may resiliently recover and bias toward a neutral position when the fenestration unit is opened. For example, one panel may slide between an open and closed position relative to the other panel, and the seal member may resiliently seal between the coupling members when closed and resiliently recover as the panel is opened. In some embodiments, the coupling members may both include projections that project into the interpanel gap, the seal member may be mounted to one of the projections, and the seal member may resiliently compress for sealing between the projections as the panel is closed.

In some embodiments, the coupling system may include at least two sealing members. The sealing members may resiliently deflect for sealing the gap when the panels are closed, and the sealing members may disengage and unseal the gap when the panels are opened.

The system may be highly versatile. For example, the coupling system may be configured for panels with cladded and/or uncladded stiles.

The coupling system may have a relatively low part count. Also, the coupling system may be manufactured and installed quickly and conveniently.

FIG. 1 illustrates a fenestration unit 102 according to example embodiments of the present disclosure. The fenestration unit 102 may be configured as a door unit in some embodiments. In some embodiments, the fenestration unit 102 may be configured as a slider door fenestration unit 102, such as with horizontally-sliding patio door unit for a building, dwelling, or other structure. However, it will be appreciated that features of the present disclosure may be included in a slider window fenestration unit or another fenestration unit without departing from the scope of the present disclosure.

The fenestration unit 102 may include a rectangular frame 104 that defines a first axis 103, a second axis 105, and a third axis 107, which are orthogonal to each other. The first axis 103 may be a horizontal axis extending between a first jamb 128 and a second jamb 129 of the frame 104. The second axis 105 may be a vertical axis that is generally aligned with the direction of gravity and that extends between a header 147 and a sill 149 of the frame 104. The third axis 107 may be a horizontal axis extending in an interior-exterior direction through the frame 104.

The fenestration unit 102 may also include a first panel 106, and a second panel 108. The panels 106, 108 may comprise door panels in some embodiments. Furthermore, the panels 106, 108 may include and support glazing units (e.g., those with one or more panes of glass) in some embodiments. The panels 106, 108 may be window sashes in additional embodiments.

The first and second panels 106, 108 may be supported within the frame 104. In some embodiments, the first panel 106 may be fixed within the frame 104, and the second panel 108 may be supported for movement within the frame 104 between a closed position (FIG. 2) and an open position (FIG. 3). In some embodiments, the first axis 103 defined by the frame 104 may be an axis for sliding the second panel 108 open and closed. The second panel 108 may be supported for sliding movement within the frame 104 along the first axis 103 as the second panel 108 moves within the frame 104 between the closed and open positions. The second panel 108 may be supported by one or more rollers, rolling elements, etc. for such sliding movement along the axis 103. In other embodiments, the second panel 108 may slide directly on the frame 104 with the header 147 and sill 149 supporting sliding movement of the second panel 108 along the axis 103. As such, the second panel 108 may slidingly move relative to the first panel 106 when moving between the closed position (FIG. 2) and the open position (FIG. 3).

The first panel 106 may be generally rectangular and flat. The first panel 106 may include a first side edge area 111 and a second side edge area 112, which are spaced apart along the first axis 103 across the first panel 106. Similarly, the second panel 108 may include a first side edge area 113 and a second side edge area 114, which are spaced apart across the second panel 108. Also, in some embodiments, the first panel 106 may include a first stile 118 (FIG. 2) that supports a first glazing unit 115 of the first panel 106. Likewise, in some embodiments, the second panel 108 may include a second stile 122 that supports a second glazing unit 124 of the second panel 108.

Figure 2:
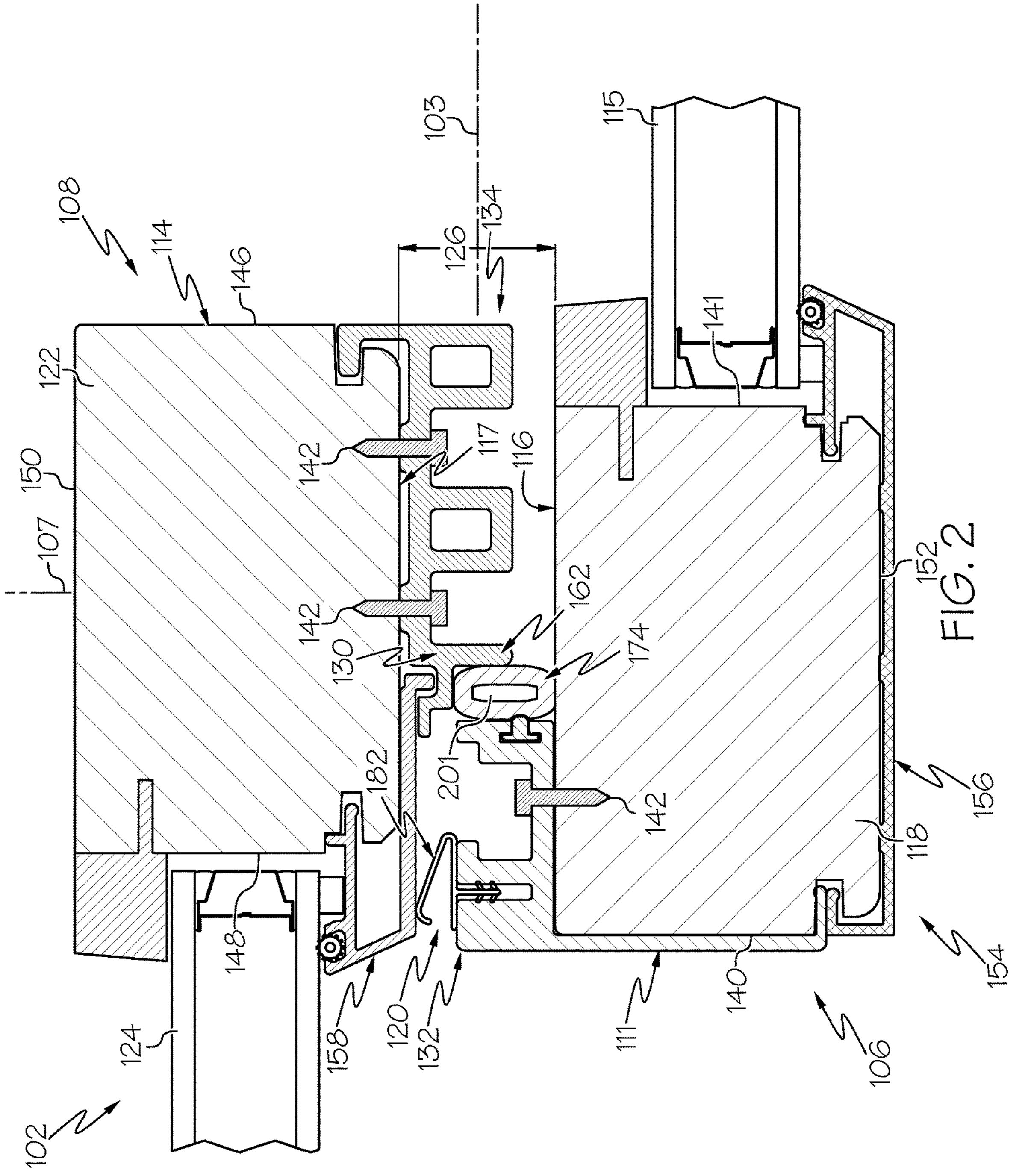
FIG. 2 is a cross sectional view of the fenestration unit and the interpanel coupling system taken along the line 2-2 of FIG. 1, wherein the fenestration unit is shown in a closed position.
Figure 3:
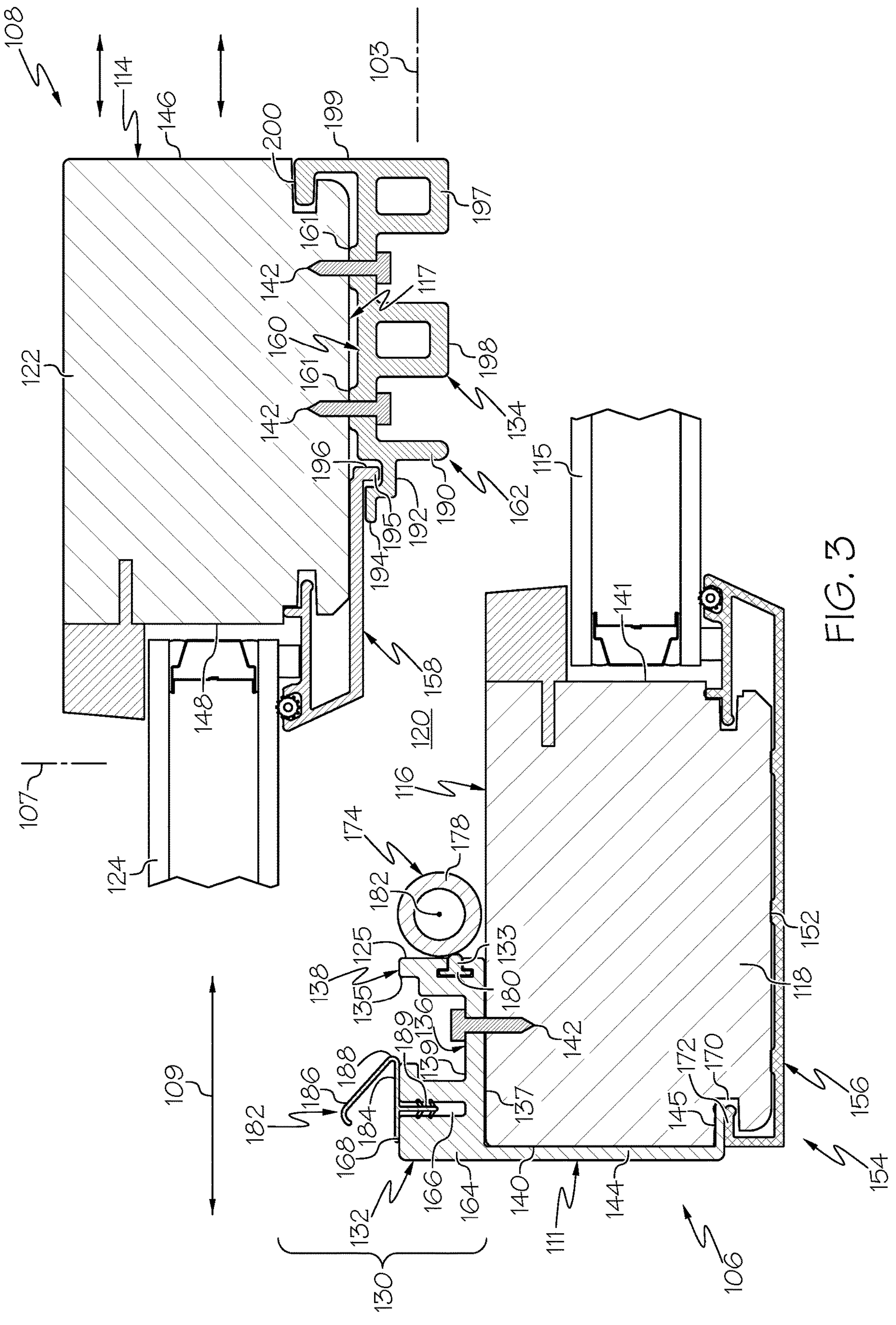
FIG. 3 is a cross sectional view of the fenestration unit and the interpanel coupling system of FIG. 2, wherein the fenestration unit is shown in an open position.

The first stile 118 and/or the second stile 122 may be substantially rectangular and solid in cross section taken perpendicular to the second axis 105 as shown in FIGS. 2 and 3. The first stile 118 may include a first face 116 that faces toward the interior of the dwelling along the third axis 107. The first stile 118 may include a first outer edge 140 that partly defines the first side edge area 111 of the first panel 106. The first stile 118 may also include a first inner edge 141 that is opposite the first outer edge 140. The first stile 118 may further include an exterior face 152 that faces outward from the dwelling along the third axis 107.

The second stile 122 may have a similar, generally rectangular profile with a second face 117 that faces toward the exterior of the dwelling along the third axis 107. The second stile 122 may also include a second outer edge 146, a second inner edge 148, and an interior face 150.

The first stile 118 and/or the second stile 122 may be made from and/or include wood, wood product composite material, or other material. In some embodiments, the fenestration unit 102 may be configured with cladding 154 (e.g., to define a cladded, wood-product fenestration unit 102).

The cladding 154 may generally include plate-like, strips of hard and strong material that may protect the underlying stile. The cladding 154 may be included for protecting surfaces that are exposed to the exterior of the dwelling. For example, in some embodiments, the cladding 154 of the fenestration unit 102 may include a first cladding member 156, which may cover over an entirety of the exterior face 152 and hook into both the first outer edge 140 and the first inner edge 141. The first cladding member 156 may also support the first glazing unit 115. Moreover, the cladding 154 may include a second cladding member 158. The second cladding member 158 may cover over a portion of the second face 117 and may hook into the second inner edge 148 of the second stile 122. The second cladding member 158 may also support the second glazing unit 124 of the second panel 108.

The first panel 106 may cover over a substantial amount of the fenestration opening within the frame 104. The second panel 108 may be sized according to that of the first panel 106 such that, when in the closed position (FIG. 2), the second panel 108 covers over the remaining area of the fenestration opening within the frame 104.

As shown in FIGS. 2 and 3, the first and second panels 106, 108 may be offset and spaced apart along the third axis 107. In some embodiments, the first panel 106 may be disposed closer to the exterior of the dwelling while the second panel 108 may be disposed closer to the interior of the dwelling along the third axis 107. Also, the first and second panels 106, 108 may overlap somewhat along the third axis 107. As such, in the closed position (FIG. 2), the first side edge area 111 of the first panel 106 and the second side edge area 114 of the second panel 108 may overlap. As the second panel 108 moves further open (e.g., toward the position of FIG. 3), the second panel 108 moves further behind the first panel 106 for additional area of overlap between the panels 106, 108.

The first panel 106 and the second panel 108 may cooperate to define an interpanel gap 120 therebetween. The interpanel gap 120 may be defined between surfaces of the panels 106, 108 that face opposite along the third axis 107 and that overlap each other when the fenestration unit 102 is viewed along the third axis 107. More specifically, in the closed position (FIG. 2), the first face 116 may oppose and face opposite the second face 117 to define the gap 120. As shown in FIG. 2, a width 126 of the interpanel gap 120 may be defined along the third axis 107 between the first face 116 and the second face 117. The gap 120 may also be defined, for example, by space between the second glazing unit 124 and the first face 116 when the second panel 108 moves toward the open position.

It will be appreciated that the width 126 of the gap 120 is selected to provide sufficient clearance for movement of the second panel 108 relative to the first panel 108. The width 126 may also be selected to facilitate closure of the gap 120 when the second panel 108 is in the closed position. It will be appreciated that the frame 104, the first panel 106, the second panel 108, etc. may be selectively dimensioned, toleranced, assembled, sized, manufactured, or otherwise provided to define a suitable gap 120 between the panels 106, 108.

The fenestration unit 102 may additionally include an interpanel coupling system 130. Generally, the coupling system 130 may block, close-off, and/or seal the gap 120 when in the closed position (FIG. 2). The coupling system 130 may provide a number of advantages as detailed below.

The interpanel coupling system 130 may generally include a first coupling member 132 and a second coupling member 134. The first coupling member 132 may be attached to the first panel 106, and the second coupling member 134 may be attached to the second panel 108. The first coupling member 132 and second coupling member 134 may couple, engage, etc. together when in the closed position (FIG. 2), and the coupling members 132, 134 may uncouple, disengage, etc. as the second panel 108 moves toward the open position (FIG. 3). The second panel 108 may also easily and conveniently move back toward the closed position, and the interpanel coupling system 130 may re-couple, re-engage, etc. to block, close-off, and/or seal the gap 120 when in the closed position (FIG. 2). Accordingly, the interpanel coupling system 130 may provide convenience and energy-efficient solutions for blocking, closing-off, and/or sealing the gap 120.

When the second panel 108 is closed (FIGS. 1 and 2), the first and second coupling members 132, 134 may be disposed in a substantially centralized position within the frame 104 along the first axis 103. The first coupling member 132 may be included on the first (inner) side edge area 111 of the first panel 106, and the second coupling member 134 may be included on the second (inner) side edge area 114 of the fenestration unit 102.

As shown in FIG. 3, the first coupling member 132 may include including a first facing member 136 and at least one projection, such as a first projection 138. The first coupling member 132 may be unitary and one-piece, and the first facing member 136 and first projection 138 may be integrally connected together. In some embodiments, the first coupling member 132 may be a lineal member that is elongate so as to extend primarily along the second axis 105.

The first facing member 136 may be a thin, flat strip of covering material that may be layered and covered over the first face 116. The first facing member 136 may include an inner facing surface 137 that mates to and layers over the first face 116. The first facing member 136 may also include an outer facing surface 139 that faces in the opposite direction along the third axis 107. The first projection 138 may be a flange with a polygonal cross-section (FIG. 3) that projects along the third axis 107 at an edge of the first facing member 136. The first projection 138 may project normally from the outer facing surface 139 and into the gap 120. The first projection 138 may include an aperture 133, such as a kerf, groove, T-slot, etc. The aperture 133 may be included in a first seat surface 125 of the first projection 138. The first seat surface 125 may lie substantially within a plane defined by the second axis 105 and the third axis 107, and the first seat surface 125 may face along the first axis 103, toward the second coupling member 134. The first projection 138 may further include a stepped surface 135 with steps that face into the gap 120.

The first coupling member 132 may further include another projection 164. The projection 164 may have a polygonal, somewhat rectangular, or block-shaped cross-section (FIG. 3). The projection 164 may project along the third axis 107 from the first facing member 136. The projection 164 may project normally from the outer facing surface 139 and into the gap 120. The projection 164 may include an aperture 166, such as a kerf, groove, T-slot or other slot, etc. The aperture 166 may be included on a second seat surface 168 of the projection 164. The second seat surface 168 may lie substantially within a plane defined by the first axis 103 and the second axis 105, and the second seat surface 168 may face toward the interior of the dwelling and toward the second panel 108 along the third axis 107.

The first coupling member 132 may additionally include an edge facing plate 144 and a hooked terminal edge 145. The edge facing plate 144 may be a thin, planar, flange that projects along the third axis 107 from the edge of the inner facing surface 137. The edge facing plate 144 may turn to extend along the first axis 103 and terminate to define the hooked terminal edge 145 as shown in FIG. 3. Furthermore, the hooked terminal edge 145 may hook into a groove 170 in the first stile 118. In some embodiments, the edge 145 may hook into the groove 170 together with a cladding hook 172 of the first cladding member 156. In additional embodiments, the groove 170 may be solely for receiving the edge 145 of the first coupling member 132.

Thus, the first facing member 136 may be layered over and attached to the first face 116 of the first stile 118 with the first projection 138 projecting along the third axis 107 into the gap 120. Also, the edge facing plate 144 may layered over to cover the first outer edge 140 of the first stile 118. In some embodiments, the first facing member 136 may be fixedly attached to the first stile 118 with one or more fasteners 142, such as screws, that extend along the third axis 107 through the first facing member 136 and into the first face 116 of the first stile 118.

The coupling system 130 may further include a first seal member 174. The first seal member 174 may be of any suitable type for sealing the gap 120. For example, the first seal member 174 may include a hollow, weatherstrip tube 178 and a mounting strip 180 that is received and attached within the aperture 133. As shown in FIG. 3, with the second panel 108 in the open position, the weatherstrip tube 178 may have a first position (i.e., a normal position). In this position, the tube 178 may have a rounded (e.g., circular) cross section. The tube 178 may also engage, abut, and/or seal against the second coupling member 134 when the second panel 108 is in the closed position. When the second panel 108 is closed, the tube 178 may resiliently compress and deform to a resiliently compressed and flexed position (FIG. 2). The tube 178 may be resiliently biased toward the normal position represented in FIG. 3. The tube 178 may be made from elastic, resilient, polymeric material (e.g., thermoplastic polyurethane (TPU)) to provide sufficient resiliency, protection from rain, wind, etc., for use as a thermal barrier, and/or for sound insulation. Also, the material of the mounting strip 180 may provide robust attachment of the first seal member 174 to the first projection 138 of the first coupling member 132.

Moreover, the coupling system 130 may include a second seal member 182. The second seal member 182 may be of any suitable type for further sealing the gap 120. For example, the second seal member 182 may have a V-shaped cross section as shown in FIG. 3. The second seal member 182 may have a seat portion 184 (i.e., a first portion) that may attach to and layer over the second seat surface 168, the second seal member 182 may also include a flap 186 (i.e., a second portion) that is attached at one edge to the seat portion 184 at a joint 188 (e.g., at a living hinge joint attaching the seat portion 184 and flap 186). The second seal member 182 may include an attachment projection 189, such as a ribbed projection that projects from the seat portion 184. The attachment projection 189 may be received in the aperture 166 for fixing the seat portion 184 in place over the seat surface 168. With the second panel 108 in the open position (FIG. 3), the flap 186 may project off from the seat portion 184 at an angle (i.e., in a neutral, unflexed position) into the interpanel gap 120. With the second panel 108 in the closed position, the flap 186 may engage, abut, and/or seal against the second panel 108. The flap 186 may resiliently flex toward the seat portion 184 about the joint 188 toward a flexed position (FIG. 2). The flap 186 may be biased to resiliently recover back to the neutral position as the second panel 108 moves back toward the open position (FIG. 3). The second seal member 182 may be made from elastic, polymeric material to provide sufficient resiliency, protection from rain, wind, etc., for use as a thermal barrier, and/or for sound insulation. Also, the material of the attachment portion 189 may provide robust attachment of the second seal member 182 to the second projection 164 of the first coupling member 132.

Although the first seal member 174 is illustrated as being attached to the first coupling member 132 for coupling to the second coupling member 134 (FIG. 2), the first seal member 174 may, in additional embodiments, be attached to the second coupling member 134 for coupling to the first coupling member 132. Likewise, the second seal member 182 may, in additional embodiments, be attached to the second coupling member 134 for coupling to the first panel 106. Furthermore, the first seal member 174 and/or the second seal member 182 may be configured differently from the illustrated embodiments. In some embodiments, for example, the second seal member 182 may include a first portion that attaches to the first coupling member and a second portion with a plurality of piles that extends into the gap 120.

The second coupling member 134 of the interpanel coupling system 130 may include a second facing member 160 and at least one projection, such as a second projection 162. The second coupling member 134 may be unitary and one-piece, and the second facing member 160 and the second projection 162 may be integrally connected together. In some embodiments, the second coupling member 134 may be a lineal member that is elongate so as to extend primarily along the second axis 105.

The second facing member 160 may be a thin, substantially flat strip of covering material that may be layered and covered over the second face 117. The second facing member 160 may include a plurality of seat rails 161 that project slightly from the back side thereof. Fasteners 142 may extend through the second facing member 160 and through the seat rails 161 to attach to the second stile 122. The second projection 162 may include a flange 190 that projects normally from the second facing member 160 along the third axis 107 away from the second stile 122 and into the gap 120. The second projection 162 may also include a leading edge seat 192 that may be a flat surface that faces normal to the third axis 107. The leading edge seat 192 may be disposed adjacent the flange 190, on the side closest to the first coupling member 132 and the first seal member 174. The second coupling member 134 may also include a forward lip 194 with an undercut groove 196 that is open toward the second stile 122. The second facing member 160 may be layered over and attached to the second face 117 of the second stile 122 with the flange 190 projecting into the gap 120 and the leading edge seat 192 facing toward the gap 120 along the third axis 107.

In some embodiments, the forward lip 194 may partly overlap the second cladding member 158. Also, an outturned terminal edge 195 of the cladding member 158 may be received in the undercut groove 196 of the second coupling member 134. Accordingly, the cladding member 158 and the second facing member 160 may cooperatively cover an entirety of the face 117.

The second coupling member 134 may further include an outer projection 197 and an intermediate projection 198, one or both of which may have a rectangular and hollow cross sectional profile taken normal to the second axis 105. The intermediate projection 198 may be spaced apart along the first axis 103 from the second projection 162 and the outer projection 197. This spacing may provide access for one or more fasteners 142 to extend through the second facing member 160 and into the second stile 122.

The second coupling member 134 may additionally include a hooked outer edge 199 that wraps partly around the second outer edge 146 of the second stile 122. The hooked outer edge 199 may be hooked and received in an outer groove 200 of the second stile 122.

As the second panel 108 moves from the open position (FIG. 3) toward the closed position (FIG. 2), the first seal member 174 may engage, abut, and seal against both the opposing surface of the flange 190 and the leading edge seat 192. The first seal member 174 may also deform against the first face 116 of the first stile 118 and the first seat surface 125 of the projection 138. Thus, with the second panel 108 closed, the first face 116, the first seat surface 125, the flange 190 and the leading edge seat 192 may cooperate to define an opening 201 therebetween (FIG. 2). The opening 201 may be substantially rectangular in some embodiments. The opening 201 may be selectively sized to receive the weatherstrip tube 178 and for deforming the weatherstrip tube 178 to properly engage the interpanel coupling system 130.

In some embodiments, the first coupling member 132 and the second coupling member 134 of the interpanel coupling system 130 may be made from, constructed of, and/or include different materials. The (first) material of the first coupling member 132 may be tailored for the first panel 106, and the (second) material of the second coupling member 134 may be tailored for the second panel 108.

In some embodiments, the material of the first coupling member 132 may have higher fracture strength than the material of the second coupling member 134 such that the first coupling member 132 has higher fracture strength than the second coupling member. Also, in some embodiments, the material of the second coupling member 134 may have lower thermal conductivity than the material of the first coupling member 132 such that the second coupling member 134 has lower thermal conductivity than the first coupling member 132.

In some embodiments, for example, the first coupling member 132 may be constructed from a metal material (e.g., Aluminum alloy), and the second coupling member 134 may be constructed from a composite material (e.g., fiberglass) and/or a polymeric material. Accordingly, the first coupling member 132 may provide high strength and robustness for reinforcing the first stile 118, and the second coupling member 134 may limit heat transfer into or out of the dwelling due to its relatively low thermal conductivity.

Moreover, the projections 164, 138 of the first coupling member 132 may be rib-like to resist bending of the stile 118 and to add stiffness thereto. Likewise, the projections 197, 198, 162 of the second coupling member 134 may be rib-like to resist bending of the stile 122 and to add stiffness thereto. Thus, both the stiles 118, 122 may be reinforced by the coupling system 130, for example, to resist bending about the first axis 103 due to the shape and configuration of the coupling members 132, 134. The hollow cavity within the projections 197, 198 may also save on material costs without compromising on structural integrity.

The seal members 174, 182 may also be positioned and configured to repeatedly provide effective sealing, blocking, and closing-off of the interpanel gap 120. The user may simply slide the panel 108 open and closed and the coupling system 130 automatically and passively engages and disengages as a result for ergonomic and convenient use.

Moreover, the interpanel coupling system 130 may provide manufacturing advantages. The parts may be manufactured efficiently. For example, the first and second coupling members 132, 134 may be extruded parts for highly efficient manufacture. Also, the seal members 174, 182 may be attached easily and conveniently to the coupling members 132, 134, respectively. Additionally, tolerancing may be relatively loose when manufacturing and assembling the coupling system 130 to the panels 106, 108. Looser tolerancing is acceptable, for example, at the gap 120 because the resiliently deflectable first seal member 174 may resiliently deform to make up for significant tolerance stack-up for closing-off the gap 120. Accordingly, assembly of the fenestration unit 102 may be highly convenient.

Figure 4:
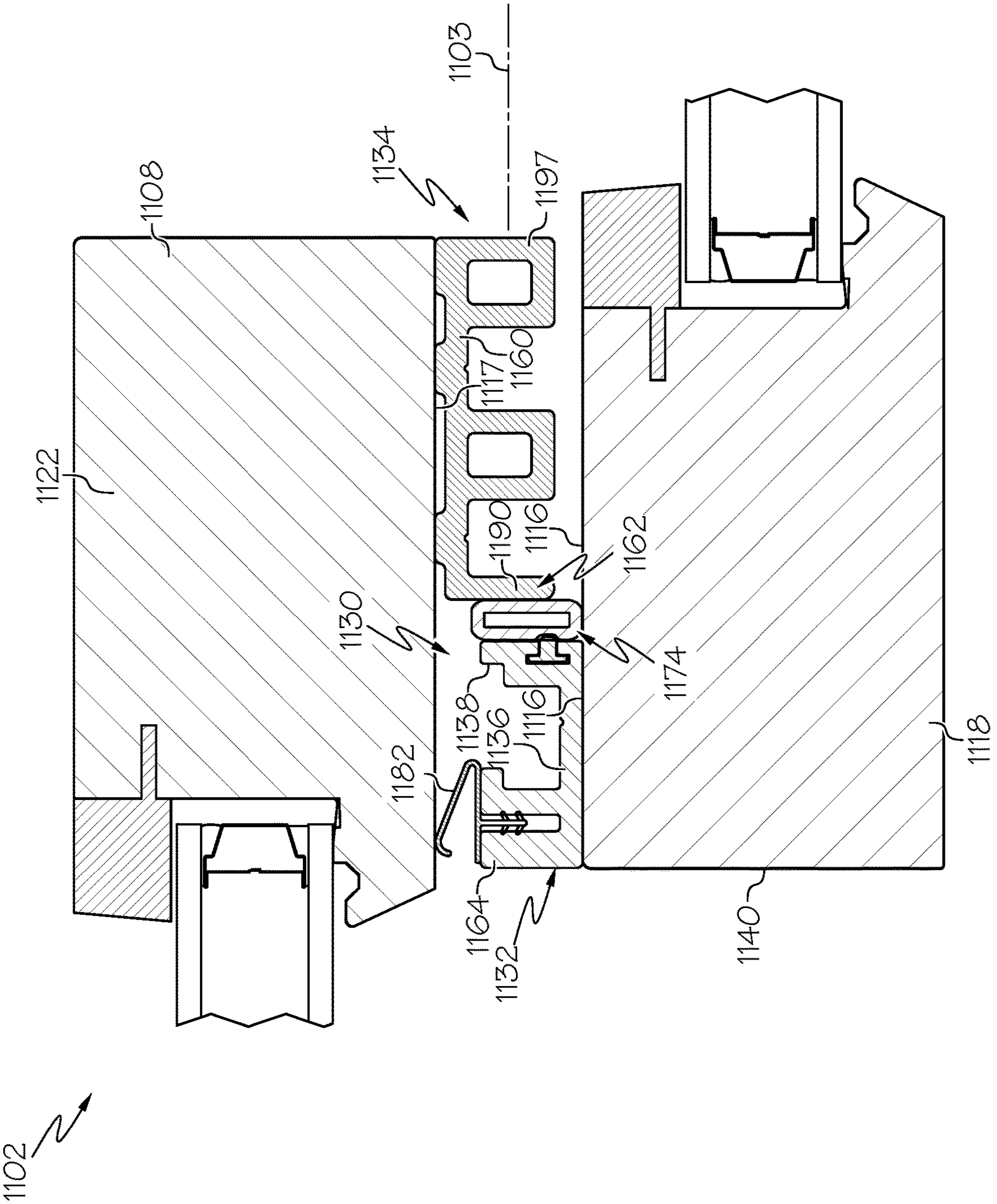
FIG. 4 is a cross sectional view of the fenestration unit and interpanel coupling system according to additional example embodiments of the present disclosure.

Referring now to FIG. 4, additional embodiments of the interpanel coupling system 1130 of the fenestration unit 1102 are shown according to additional example embodiments. The coupling system 1130 may be substantially similar to the embodiments of FIGS. 2 and 3, except as noted. Thus, the description of common features will not be repeated. Also, for clarity, components that correspond to those of FIGS. 2 and 3 are identified with corresponding reference numbers increased by 1000.

As shown, the interpanel coupling system 1130 may be configured for use with different types of stiles 1118, 1122. Unlike the cladded stiles of FIGS. 2 and 3, the first stile 1118 and the second stile 1122 of FIG. 4 may be unclad. The stiles 1118, 1122 may be constructed from wood, wood product composite, or other material. The first coupling member 1132 may include the first facing member 1136, the first projection 1138, and the other projection 1164. The first seal member 1174 may be attached to the first projection 1138, and the second seal member 1182 may be attached to the other projection 1164. The first facing member 1136 may be layered over the first face 1116. The projection 1164 may define a terminal face of the first coupling member 1132 and may be substantially flush, even, level, and/or co-planar with the first outer edge 1140. In other words, the edge facing plate 144 of FIG. 3 may be omitted from the first coupling member 1132.

The second coupling member 1134 may include the second facing member 1160, the second projection 1162, the outer projection 1197, and the intermediate projection 1198. The second projection 1162 may include the flange 1190 with a surface that opposes the first projection 1138 and the first seal member 1174. The surface of the flange 1190 opposing the first projection 1138 along the first axis 1103 may be a terminal face of the second coupling member 1134 (i.e., the leading edge seat 192 and lip 194 of FIG. 3 may be omitted). Also, the outer projection 1197 may define the other terminal face of the second coupling member 1134 along the first axis 1103 (i.e., the hooked outer edge 199 of FIG. 3 may be omitted).

As shown in FIG. 4, when the second panel 1108 is in the closed position, the first seal member 1174 may engage, resiliently deform, and seal against the opposing surfaces of the first projection 1138 and flange 1190. In some embodiments, the first seal member 1174 also may deform and seal against the first face 1116 of the first stile 1118 and/or the second face 1117 of the second stile 1122 when the second panel 1108 is closed. Furthermore, the second seal member 1182 may deform against the second face 1117 when the second panel 1108 is closed. Like the embodiments discussed above, the second panel 1108 may slide toward an open position, which may allow the first and second seal members 1174, 1182 to resiliently recover toward their respective neutral positions. As the second panel 1108 slides closed, the first and second seal members 1174, 1182 may engage the flange 1190 and the face 1117, respectively, to seal against those members as shown in FIG. 4.

Figure 5:
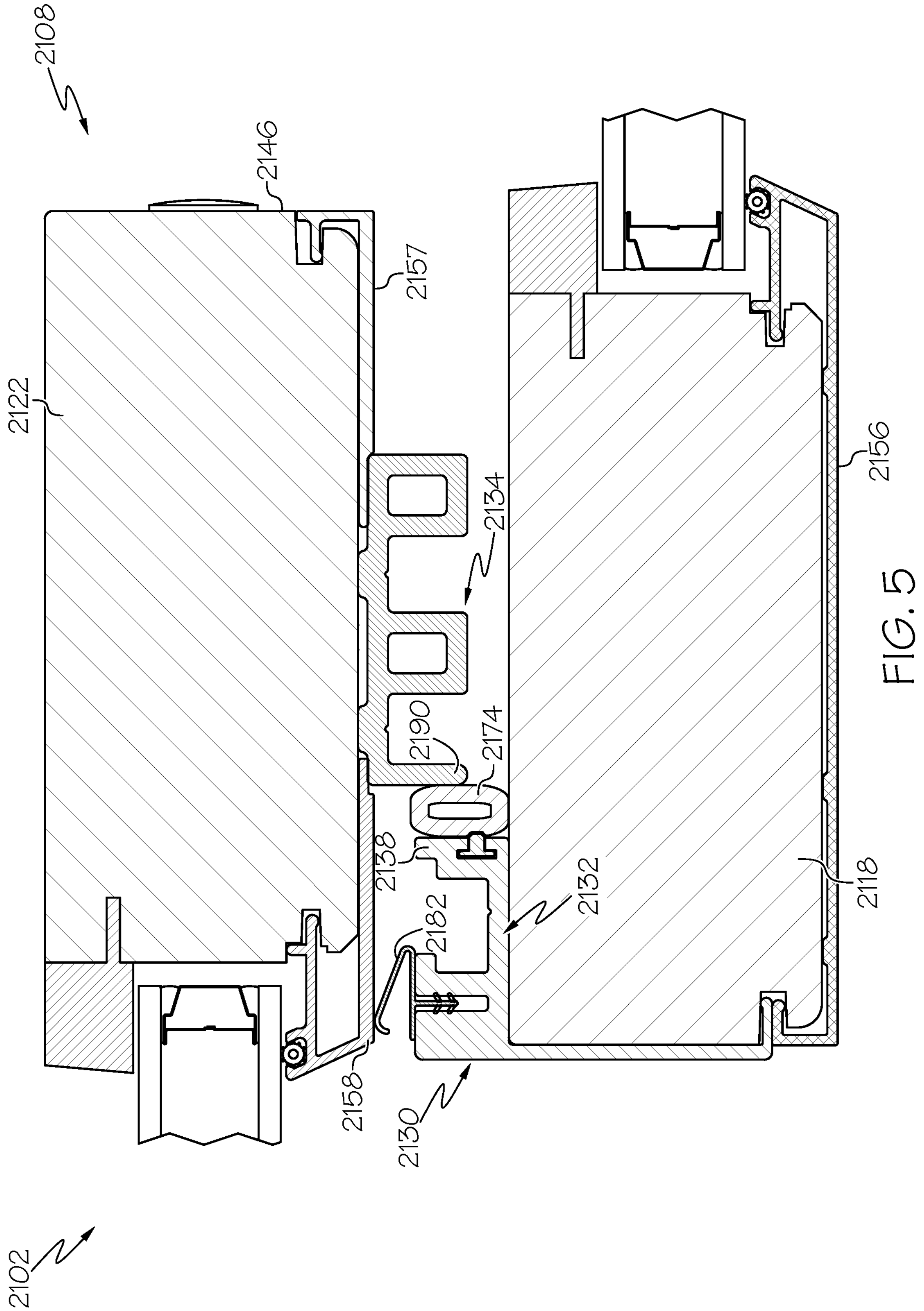
FIG. 5 is a cross sectional view of the fenestration unit and interpanel coupling system according to additional example embodiments of the present disclosure.

Referring now to FIG. 5, additional embodiments of the interpanel coupling system 2130 of the fenestration unit 2102 are shown according to additional example embodiments. The coupling system 2130 may be substantially similar to the embodiments of FIGS. 2 and 3, except as noted. Thus, the description of common features will not be repeated. Also, for clarity, components that correspond to those of FIGS. 2 and 3 are identified with corresponding reference numbers increased by 2000.

As shown, the interpanel coupling system 2130 may be configured for use with additional types of stiles 2118, 2122. Specifically, the first stile 2118 and the second stile 2122 of FIG. 5 may be cladded. The first stile 2118 may include the first cladding member 2156, and the second stile 2122 may include the second cladding member 2158 and a third cladding member 2157. The second cladding member 2158 may be similar to that of FIG. 3, except that the engagement with the second coupling member 2134 may be different than the embodiments represented in FIG. 3. As shown in FIG. 5, the second coupling member 2134 may layer partly over (i.e., overlap) the second cladding member 2158. On the opposite side, the second coupling member 2134 may layer over and partly overlap an edge of the third cladding member 2157. The third cladding member 2157 may also hook into the second outer edge 2146 of the second stile 2122. In some embodiments, the third cladding member 2157 may be constructed from vinyl, chlorinated polyvinyl chloride, or other material. Similar to the embodiments of FIGS. 2 and 3, the first seal member 2174 may resiliently deflect against and compress between the flange 2190 and the first projection 2138, and the second seal member 2182 may resiliently deflect against the second cladding member 2158. The second panel 2108 may slide toward an open position, which may allow the first and second seal members 2174, 2182 to resiliently recover toward their respective neutral positions. As the second panel 2108 is re-closed, the first and second seal members 2174, 2182 may engage the flange 2190 and the second cladding member 2158, respectively, to define one or more seals as shown in FIG. 5.

Figure 6:
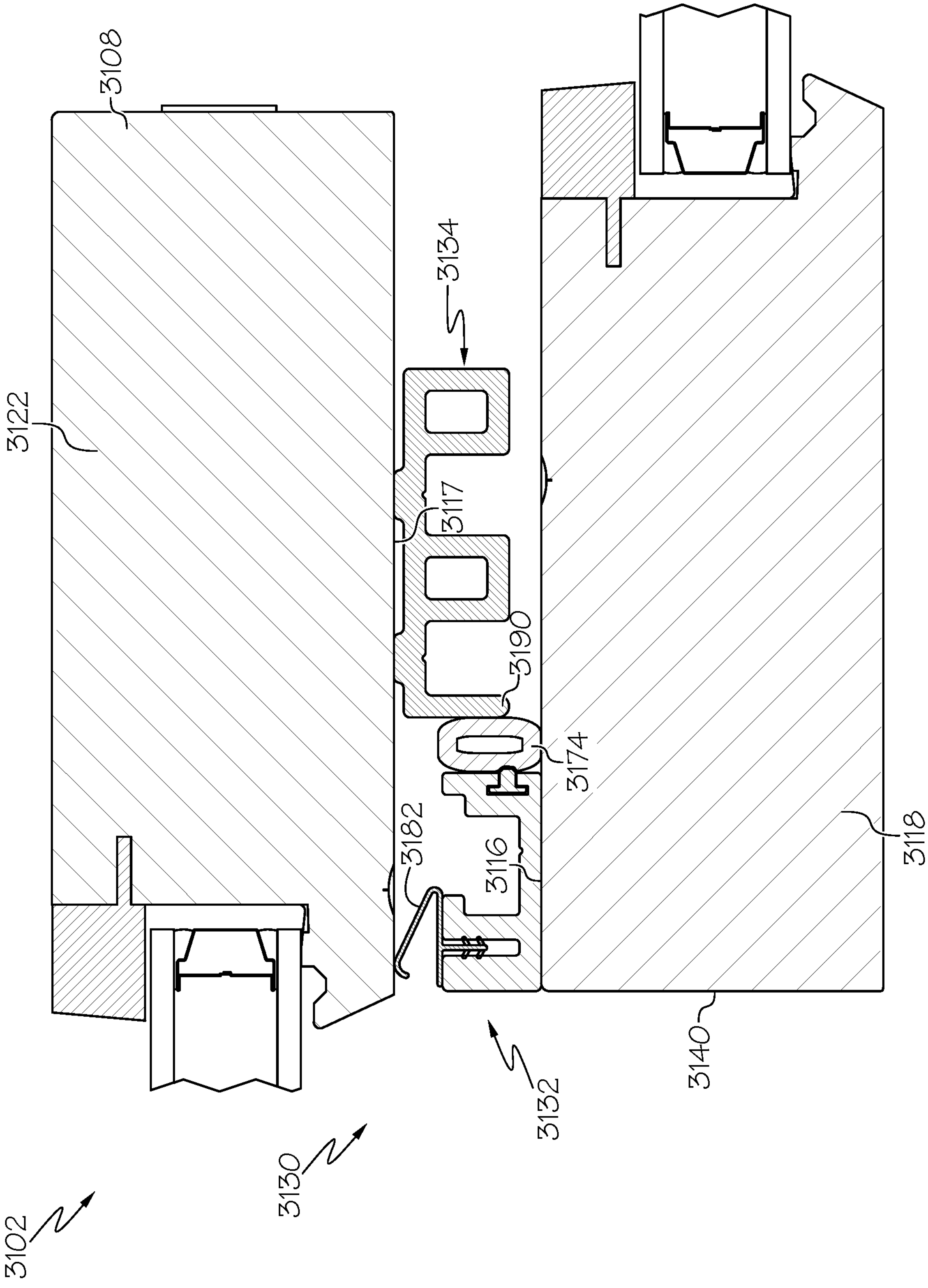
FIG. 6 is a cross sectional view of the fenestration unit and interpanel coupling system according to additional example embodiments of the present disclosure.

Referring now to FIG. 6, additional embodiments of the interpanel coupling system 3130 of the fenestration unit 3102 is shown according to additional example embodiments. The coupling system 3130 may be substantially similar to the embodiments of FIGS. 2 and 3, except as noted. Thus, the description of common features will not be repeated. Also, for clarity, components that correspond to those of FIGS. 2 and 3 are identified with corresponding reference numbers increased by 3000.

Generally, the first coupling member 3132 may be configured according to the embodiments of FIG. 4, and the second coupling member 3134 may be configured according to the embodiments of FIG. 5. The first coupling member 3132 may be fixed to the first stile 3118 to as to cover part of the first face 3116. The first coupling member 3132 may also be positioned flush with the first outer edge 3140 of the first stile 3118. The second coupling member 3134 may be attached to the second face 3117 in a position to engage the first seal member 3174 when the second panel 3108 is in the closed position. The second panel 3108 may slide open, which may allow the first and second seal members 3174, 3182 to resiliently recover toward their respective neutral positions. As the second panel 3108 re-closes, the first and second seal members 3174, 3182 may engage the flange 3190 and the face 3117, respectively, to seal against those members as shown in FIG. 6.

Figure 7:
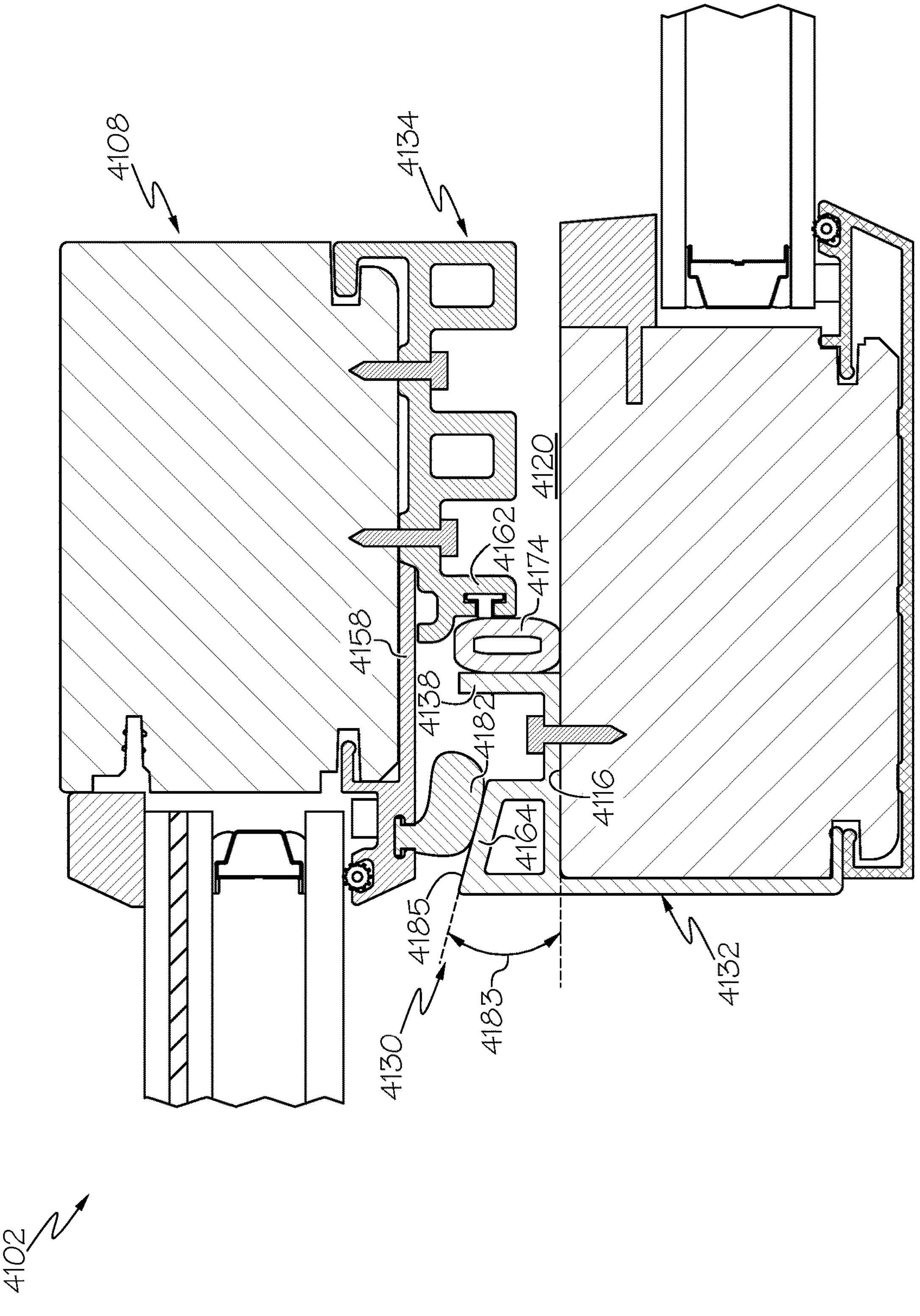
FIG. 7 is a cross sectional view of the fenestration unit and interpanel coupling system according to additional example embodiments of the present disclosure.

Referring now to FIG. 7, additional embodiments of the interpanel coupling system 4130 of the fenestration unit 4102 is shown according to additional example embodiments. The coupling system 4130 may be substantially similar to the embodiments of FIGS. 2 and 3, except as noted. Thus, the description of common features will not be repeated. Also, for clarity, components that correspond to those of FIGS. 2 and 3 are identified with corresponding reference numbers increased by 4000.

The second coupling member 4134 may be substantially similar to that of FIGS. 2 and 3, except that the second projection 4162 may be shaped and configured for supporting and attaching to the first seal member 4174.

Moreover, the first projection 4138 and the other projection 4164 of the first coupling member 4132 may be configured differently. For example, the first projection 4138 may be a thin flange that projects normally into the gap from the first face 4116. The other projection 4164 may have a hollow, quadrilateral shape with a seat surface 4185 that is disposed at an inclined or ramp angle 4183 relative to the first face 4116.

When the second panel 4108 is in the closed position, the first seal member 4174 may engage, abut, seal, and/or compress between the opposing surfaces of the first projection 4138 and the second projection 4162. Also, the second seal member 4182 may be a fan or brush seal that is attached to and supported by the second cladding member 4158. The second seal member 4182 may engage, abut, seal, and resiliently deform against the seat surface 4185 of the projection 4164. Opening the second panel 4108 may allow the seal members 4174, 4182 to resiliently recover. Re-closing the second panel 4108 may allow the seal members 4174, 4182 to re-engage to close off the interpanel gap 4120.

Figure 8:
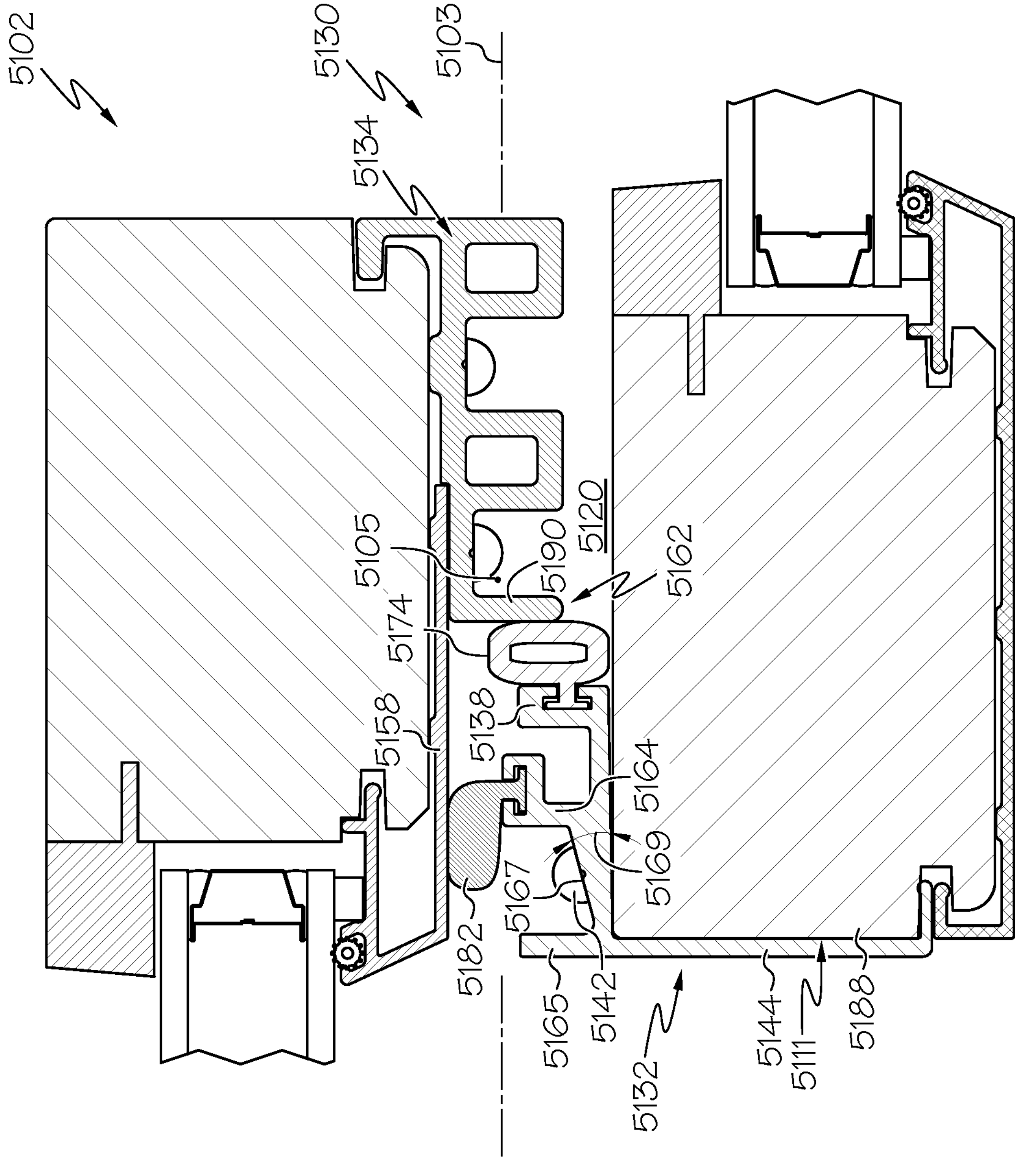
FIG. 8 is a cross sectional view of the fenestration unit and interpanel coupling system according to additional example embodiments of the present disclosure.

Referring now to FIG. 8, additional embodiments of the interpanel coupling system 5130 of the fenestration unit 5102 is shown according to additional embodiments. The coupling system 5130 may be substantially similar to the embodiments of FIGS. 2 and 3, except as noted. Thus, the description of common features will not be repeated. Also, for clarity, components that correspond to those of FIGS. 2 and 3 are identified with corresponding reference numbers increased by 5000.

The first coupling member 5132 may include the first projection 5138 for supporting and retaining the first seal member 5174. The second projection 5164 may support and retain the second seal member 5182. In some embodiments, the first seal member 5174 may be hollow and tubular whereas the second seal member 5182 may be a fan or brush seal. The edge facing plate 5144 of the first coupling member 5132 may hook into the first stile 5188. The first coupling member 5132 may additionally include an edge flange 5165 that projects into the interpanel gap 5120 at the side edge area 5111. Moreover, the first coupling member 5132 may include a fastener seat 5167 defined between the edge flange 5165 and the second projection 5164. The fastener seat 5167 may have a smooth, flat, substantially planar surface that is disposed at an angle 5169 relative to the plane defined by the first axis 5103 and the second axis 5105.

The fastener seat 5167 may support a fastener 5142, which may extend through the seat 5167 and into the first stile 5188. Because of the angle 5169, the axis of the fastener 5142 (i.e., the axis of insertion of the fastener 5142) may be directed slightly from the side edge area 5111 and into the stile 5188 to facilitate installation of the first coupling member 5132.

The second coupling member 5134 may be substantially similar to the embodiment of FIGS. 2 and 3. However, the second coupling member 5134 may terminate at the flange 5190. Also, the second coupling member 5134 may stepped to engage and overlap the second cladding member 5158 as shown.

In summary, the interpanel coupling system 130, 1130, 2130, 3130, 4130, 5130 provide effectiveness and repeatable closure of the interpanel gap. The system 130, 1130, 2130, 3130, 4130, 5130 is also convenient and ergonomic. The system 130, 1130, 2130, 3130, 4130, 5130 provides manufacturing and installation efficiencies as well.

It is intended that subject matter disclosed in particular portions herein can be combined with the subject matter of one or more of other portions herein as long as such combinations are not mutually exclusive or inoperable. In addition, many variations, enhancements and modifications are possible.

The terms and descriptions used above are set forth by way of illustration only and are not meant as limitations. Those skilled in the art will recognize that many variations can be made to the details of the above-described embodiments without departing from the underlying principles of the present disclosure.

The invention claimed is:

1. A fenestration unit comprising:

a frame that defines an axis;

a first panel supported in the frame;

a second panel moveably supported in the frame for sliding movement along the axis between a closed position and an open position relative to the first panel, the second panel including a second face configured to face a first face of the first panel to define an interpanel gap therebetween;

an interpanel coupling system with a first coupling member and a second coupling member;

the first coupling member including a first facing member that is attached to the first panel to cover over at least part of the first face, the first coupling member including a first projection that projects from the first facing member into the interpanel gap, the first coupling member being unitary with the first facing member and the first projection being integrally attached;

the second coupling member including a second facing member that is attached to the second panel to cover over at least part of the second face, the second coupling member including a second projection that projects from the second facing member into the interpanel gap, the second coupling member being unitary with the second facing member and the second projection being integrally attached;

the coupling system including a seal member that is attached to one of the first projection and the second projection, the seal member configured to engage and resiliently deflect against the other of the first projection and the second projection when the second panel is in the closed position, the seal member configured to disengage the other of the first projection and the second projection and resiliently recover toward a neutral position as the second panel moves toward the open position; and the first coupling member being constructed from a first material and the second coupling member being constructed from a second material that is different from the first material.

2. The fenestration unit of claim 1, wherein the first projection includes a first surface and the second projection includes a second surface that face in opposite directions along the sliding axis, and wherein the sealing member is configured to resiliently compress between the first surface and the second surface as the second panel moves toward the closed position.

3. The fenestration unit of claim 1, wherein the first material has higher fracture strength than the second material.

4. The fenestration unit of claim 3, wherein the second material has lower thermal conductivity than the first material.

5. The fenestration unit of claim 1, wherein the first material is a metal, and wherein the second material is one of a composite material and a polymeric material.

6. The fenestration unit of claim 1, wherein the seal member is a first seal member of the coupling system;

wherein the interpanel coupling system includes a second seal member that is attached to the first coupling member, the second seal member configured to engage and resiliently deflect against the second panel when the second panel is in the closed position, the second seal member configured to disengage the second panel and resiliently recover toward a second neutral position as the second panel moves toward the open position.

7. The fenestration unit of claim 6, wherein the second seal member includes a first portion that is fixed to the first coupling member and a second portion configured to engage and resiliently deflect against the second panel when the second panel is in the closed position.

8. The fenestration unit of claim 1, wherein the axis is a first axis, wherein the first panel defines a second axis that is normal to the first axis, and wherein first coupling member includes a fastener seat that is disposed at an angle relative to a plane defined by the first axis and the second axis, the fastener seat configured to support a fastener that attaches the first coupling member to the first panel.

9. The fenestration unit of claim 1, wherein the seal member is a first seal member of the coupling system, wherein the first seal member is attached to the first projection, and wherein the first seal member is configured to engage and resiliently deflect against the second projection when the second panel is in the closed position.

10. The fenestration unit of claim 9, wherein the coupling system includes a second seal member that is attached to the first coupling member, wherein the second seal member is configured to engage and resiliently deflect against the second panel when the second panel is in the closed position.

11. The fenestration unit of claim 1, further comprising a cladding member; and wherein the cladding member and one of the first facing member and the second facing member cooperatively cover one of the first face and the second face.

12. The fenestration unit of claim 1, wherein the seal member is a first seal member of the coupling system, wherein the first seal member is attached to the second projection, and wherein the first seal member is configured to engage and resiliently deflect against the first projection when the second panel is in the closed position; and wherein the coupling system includes a second seal member that is attached to the second panel, wherein the second seal member is configured to engage and resiliently deflect against the first coupling member when the second panel is in the closed position.

13. The fenestration unit of claim 1, wherein at least one of the first coupling member and the second coupling member hooks into an outer edge of one of the first stile and the second stile.

14. The fenestration unit of claim 1, wherein at least one of the first coupling member and the second coupling member includes a hollow projection that projects into the interpanel gap.

15. The fenestration unit of claim 1, wherein the first panel includes a first stile that at least partly defines the first face and the second panel includes a second stile that at least partly defines the second face, the first facing member attached to the first stile, and the second facing member attached to the second stile.

16. The fenestration unit of claim 1, wherein the first panel is fixed within the frame.

17. The fenestration unit of claim 1, wherein the axis is a first axis, wherein the first panel and the second panel are spaced apart along a second axis to define the interpanel gap, wherein the first projection and the second projection are spaced apart at a first distance along the first axis when in the closed position, and wherein the first projection and the second projection are arranged in a non-overlapping arrangement along the second axis in the closed position.

18. A method of manufacturing a fenestration unit comprising:

providing a frame that defines an axis;

supporting a first panel within the frame;

moveably supporting a second panel within the frame for sliding movement along the axis between a closed position and an open position relative to the first panel, the second panel including a second face configured to face a first face of the first panel to define an interpanel gap therebetween; and providing an interpanel coupling system with a first coupling member and a second coupling member, including:

attaching a first facing member of the first coupling member to the first panel to cover over at least part of the first face, the first coupling member including a first projection that projects from the first facing member into the interpanel gap, the first coupling member being unitary with the first facing member and the first projection being integrally attached;

attaching a second facing member of the second coupling member to the second panel to cover over at least part of the second face, the second coupling member including a second projection that projects from the second facing member into the interpanel gap, the second coupling member being unitary with the second facing member and the second projection being integrally attached, the first coupling member being constructed from a first material and the second coupling member being constructed from a second material that is different from the first material; and attaching a seal member to one of the first projection and the second projection, the seal member configured to engage and resiliently deflect against the other of the first projection and the second projection when the second panel is in the closed position, the seal member configured to disengage the other of the first projection and the second projection and resiliently recover toward a neutral position as the second panel moves toward the open position.

19. A fenestration unit comprising:

a frame that defines an axis;

a first panel supported in the frame, the first panel including a first stile;

a second panel with a second stile moveably supported in the frame for sliding movement along the axis between a closed position and an open position relative to the first panel, the second stile including a second face configured to face a first face of the first stile to define an interpanel gap therebetween;

an interpanel coupling system with a first coupling member and a second coupling member;

the first coupling member including a first facing member that is attached to the first panel to cover over at least part of the first face, the first coupling member including a first projection that projects from the first facing member into the interpanel gap, the first coupling member being unitary with the first facing member and the first projection being integrally attached, the first projection providing bending stiffness to the first stile;

the second coupling member including a second facing member that is attached to the second panel to cover over at least part of the second face, the second coupling member including a second projection that projects from the second facing member into the interpanel gap, the second coupling member being unitary with the second facing member and the second projection being integrally attached, the second projection providing bending stiffness to the second stile;

the coupling system including a first seal member that is attached to one of the first projection and the second projection, the first seal member configured to engage and resiliently deflect against the other of the first projection and the second projection when the second panel is in the closed position, the first seal member configured to disengage the other of the first projection and the second projection and resiliently recover toward a neutral position as the second panel moves toward the open position;

the coupling system including a second seal member that is attached to one of the first panel and the second panel and that is configured to resiliently deflect within the interpanel gap as the second panel moves toward the closed position;

wherein the first coupling member is constructed from a first material and the second coupling member is constructed from a second material that is different from the first material, the first coupling member having higher fracture strength than the second coupling member, and the second coupling member having lower thermal conductivity than the first coupling member.

20. The fenestration unit of claim 19, wherein the axis is a first axis, wherein the first panel and the second panel are spaced apart along a second axis to define the interpanel gap, wherein the first projection and the second projection are spaced apart at a first distance along the first axis when in the closed position, and wherein the first projection and the second projection are arranged in a non-overlapping arrangement along the second axis in the closed position.

* * * * *